United States Patent
Tachino et al.

(10) Patent No.: US 9,127,815 B2
(45) Date of Patent: Sep. 8, 2015

(54) LIGHTING APPARATUS

(71) Applicant: PANASONIC CORPORATION, Osaka (JP)

(72) Inventors: Youji Tachino, Nara (JP); Atsushi Motoya, Shiga (JP); Takashi Ohta, Osaka (JP); Hiroshi Kido, Osaka (JP); Junichi Hasegawa, Osaka (JP); Shigeo Gotoh, Osaka (JP); Nobuyuki Matsui, Osaka (JP); Tadashi Murakami, Osaka (JP); Tadasi Nisimura, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/250,900

(22) Filed: Apr. 11, 2014

(65) Prior Publication Data

US 2014/0306249 A1  Oct. 16, 2014

(30) Foreign Application Priority Data

Apr. 12, 2013 (JP) .................... 2013-084227

(51) Int. Cl.
| | |
|---|---|
| *H01L 27/15* | (2006.01) |
| *F21K 99/00* | (2010.01) |
| *B64D 11/00* | (2006.01) |
| *B60Q 3/02* | (2006.01) |
| *F21S 4/00* | (2006.01) |

(Continued)

(52) U.S. Cl.
CPC . *F21K 9/00* (2013.01); *B60Q 3/025* (2013.01); *B60Q 3/0259* (2013.01); *B64D 11/00* (2013.01); *B64D 2011/0038* (2013.01); *F21S 4/008* (2013.01); *F21Y 2101/02* (2013.01); *F21Y 2105/003* (2013.01); *F21Y 2113/005* (2013.01)

(58) Field of Classification Search
CPC ................. H01L 2924/12041; H01L 25/0753; H01L 25/167; H01L 27/153
USPC ................... 257/98, 89, 99, E33.061, 100, 95
See application file for complete search history.

(56) References Cited

U.S. PATENT DOCUMENTS 5,583,351 A * 12/1996 Brown et al. .................... 257/89
6,200,002 B1 * 3/2001 Marshall et al. .............. 362/231

(Continued)

FOREIGN PATENT DOCUMENTS

JP   2008-147049   6/2008

OTHER PUBLICATIONS

U.S. Appl. No. 14/250,908 to Tadasi Nisimura et al., filed Apr. 11, 2014.

(Continued)

*Primary Examiner* — Stephen W Smoot
*Assistant Examiner* — Edward Chin
(74) *Attorney, Agent, or Firm* — Greenblum & Bernstein, P.L.C.

(57) ABSTRACT

This lighting apparatus includes three or more LEDs arranged in a row. Each of the LEDs emits light of a color different from that of an LED adjacent to itself, and the LEDs include an LED having a relatively wide light distribution angle and others of the three or more LEDs each having a relatively narrow light distribution angle. The one LED is arranged in an inner portion in the row of the other LEDs. In this configuration, light emitted from the one LED is mixed well with lights emitted from the respective other LEDs adjacent to the one LED, and thus, color unevenness of illuminating light can be reduced.

10 Claims, 3 Drawing Sheets

(51) Int. Cl.
*F21Y 101/02* (2006.01)
*F21Y 105/00* (2006.01)
*F21Y 113/00* (2006.01)

(56) References Cited

U.S. PATENT DOCUMENTS

| | | |
|---|---|---|
| 7,791,276 B2 * | 9/2010 | Chou et al. .................. 313/512 |
| 8,455,887 B2 * | 6/2013 | Shirakawa et al. ............ 257/88 |
| 2003/0053310 A1 * | 3/2003 | Sommers ..................... 362/231 |
| 2003/0132422 A1 * | 7/2003 | Tian et al. ................ 252/301.4 S |
| 2005/0281027 A1 * | 12/2005 | Capen et al. .................. 362/231 |
| 2007/0187710 A1 * | 8/2007 | Steen et al. .................. 257/100 |
| 2007/0268694 A1 * | 11/2007 | Bailey et al. ................. 362/231 |
| 2010/0110660 A1 * | 5/2010 | Brukilacchio .................. 362/84 |

OTHER PUBLICATIONS

U.S. Appl. No. 14/250,882 to Takashi Ohta et al., filed Apr. 11, 2014.
U.S. Appl. No. 14/250,888 to Takashi Ohta et al., filed Apr. 11, 2014.

* cited by examiner

LIGHTING APPARATUS

FIELD OF THE INVENTION

The present invention relates to a lighting apparatus including a plurality of LEDs having different light distribution angles and different luminescent colors.

BACKGROUND OF THE INVENTION

To date, lighting apparatuses including a plurality of LEDs arranged in a row and having different luminescent colors have been known (refer to Patent Document 1, for example). As shown in FIG. 7, LEDs used in such a lighting apparatus include: an LED 40a that includes an encapsulant 20 that encapsulates an LED chip 10, and phosphor 30 that is dispersed in the encapsulant 20 and that converts the wavelength of light emitted from the LED chip 10; and an LED 40b that directly emits light from an LED chip 10. Generally, in the LED 40a, since the phosphor 30 excited by light from the LED chip 10 emits light itself, the entirety of the encapsulant 20 including the phosphor 30 acts like a pseudo light source. Thus, the LED 40a has a wider light distribution angle than the LED 40b.

CITATION LIST

Patent Document

Patent Document 1: Japanese Laid-Open Patent Publication No. 2008-147049

BRIEF SUMMARY OF THE INVENTION

Problems to be Solved by the Invention

However, in the lighting apparatus described above, since the LEDs having different light distribution angles are arranged in a row, lights emitted from the respective LEDs adjacent to each other are not sufficiently mixed with each other (refer to the area surrounded by a dotted line in FIG. 7) depending on the arrangement of the LEDs. This may cause color unevenness of illuminating light.

The present invention has been made to solve the above problem. An object of the present invention is to provide a lighting apparatus including a plurality of LEDs that have different light distribution angles and different luminescent colors, which is capable of reducing color unevenness of illuminating light by sufficiently mixing lights emitted from the respective LEDs adjacent to each other.

Solution to the Problems

A lighting apparatus of the present invention is a lighting apparatus including three or more LEDs arranged in a row or a matrix, wherein the three or more LEDs adjacent to each other emit lights of different colors, respectively, and include at least one LED having a relatively wide light distribution angle and LEDs each having a relatively narrow light distribution angle, and the LEDs each having the narrow light distribution angle are arranged in such a manner as to sandwich the LED having the wide light distribution angle.

The LED having the wide light distribution angle preferably includes an LED chip and phosphor that converts a wavelength of light emitted from this LED chip.

Preferably, the LED chip is formed by a blue LED chip that emits blue light, and the phosphor is formed by green phosphor that converts blue light into green light.

Preferably, the three or more LEDs include a red LED including a red LED chip that emits red light, a green LED that emits green light, and a blue LED that emits blue light, and a distance between the red LED, and the green LED or the blue LED is greater than a distance between the green LED and the blue LED.

Effects of the Invention

According to the present invention, since the LED having the wide light distribution angle is arranged in an inner portion in the row of the three or more LEDs, light emitted from the LED having the wide light distribution angle is mixed well with lights emitted from the respective LEDs adjacent to the LED having the wide light distribution angle, enabling color unevenness of illuminating light to be reduced.

DETAILED DESCRIPTION OF THE INVENTION

Figure 1:
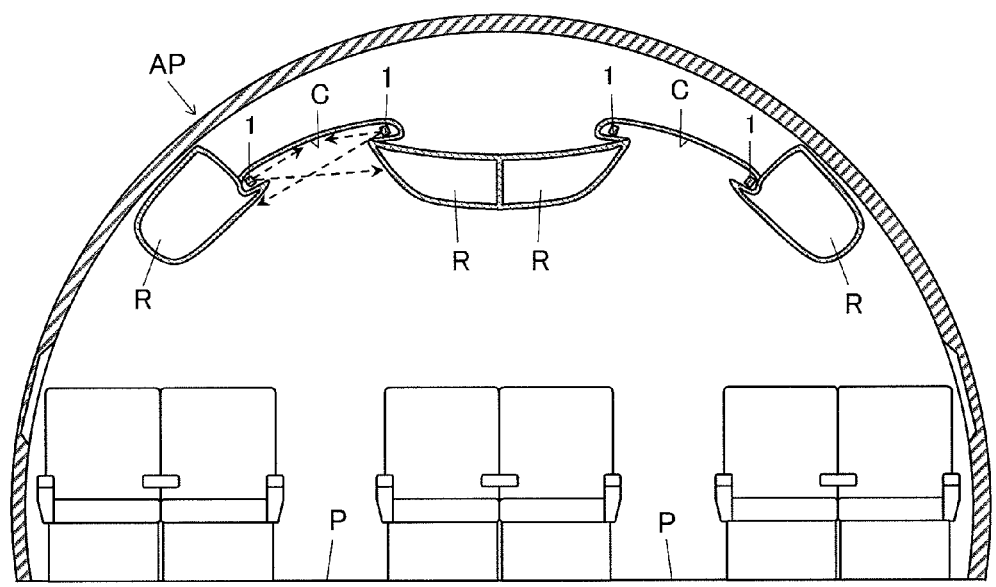
FIG. 1 is a cross-sectional view of an aircraft in which lighting apparatuses according to an embodiment of the present invention are arranged.

A lighting apparatus according to an embodiment of the present invention will be described with reference to FIGS. 1 to 4. As shown in FIG. 1, lighting apparatuses 1 are used for illuminating a ceiling C in a cabin of an aircraft AP. The lighting apparatuses 1 are mounted to upper ends of overhead storage bins R located above and along one side and the other side of each of passenger aisles P. Light (shown in a dashed arrow) from each lighting apparatus 1 irradiates the ceiling C, and also irradiates an upper portion of the overhead storage bin R facing to the lighting apparatus 1.

Figure 2:
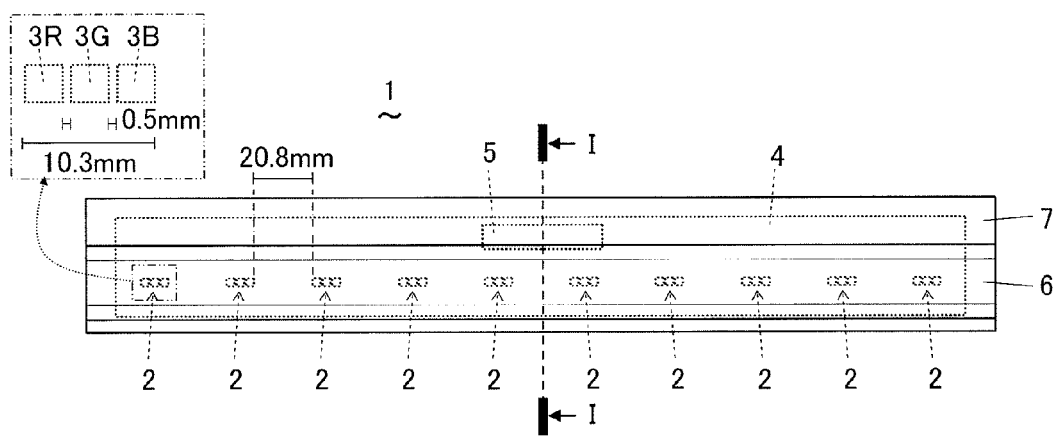
FIG. 2 is a top view of each lighting apparatus.
Figure 3:
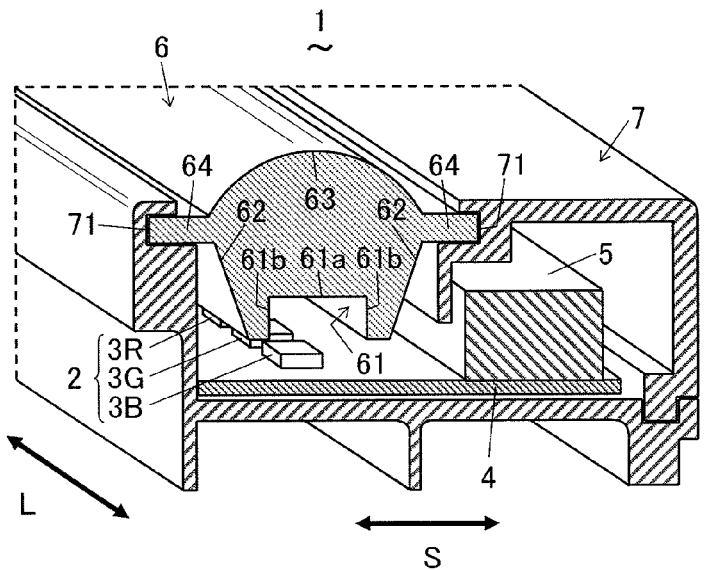
FIG. 3 is a perspective view including a cross section taken along an I-I line in FIG. 2.

As shown in FIG. 2 and FIG. 3, each lighting apparatus 1 has an elongated shape, and includes a plurality of LED units 2 arranged linearly. In FIG. 2, for example, ten LED units 2 are arranged at intervals of 20.8 mm. Each LED unit 2 includes three or more LEDs 3 arranged in a row. In FIG. 2, for example, a red LED 3R, a green LED 3G, and a blue LED 3B are arranged at intervals of 0.5 mm such that the length of the LED unit 2 is 10.3 mm in the direction along which the LEDs 3 are arranged.

The lighting apparatus 1 also includes a wiring board 4 on which the LED units 2 are mounted, a drive circuit 5, mounted on the wiring board 4, for driving the LED units 2, a lens 6 that controls distribution of light emitted from each LED unit 2, and a frame 7 that holds the these components 2, 4, and 6. The drive circuit 5 includes drivers (not shown) for individually performing dimming control of the red LED 3R, the green LED 3G, and the blue LED 3B.

The lens 6 has an elongated shape that covers all the ten LED units 2 and has a recess 61 at its surface facing to the LED units 2 (refer to FIG. 3). The recess 61 has a bottom surface serving as a first light incident surface 61a where light emitted from each LED unit 2 to the forward direction enters, and side surfaces serving as second light incident surfaces 61b where light emitted sideways from each LED unit 2 enters. In addition, the lens 6 includes total reflection surfaces 62 that are provided so as to face the second light incident surfaces 61b and totally reflect the light that enters from the second light incident surfaces 61b, and a light emitting surface 63 that emits the light that is totally reflected by the total reflection surfaces 62 and the light that enters from the first light incident surface 61a. The light emitting surface 63 has a convex shape and condenses light to emit. Furthermore, the lens 6 has a pair of flange portions 64 extending outward from both ends of the lens 6 in the transverse direction (S). The pair of flange portions 64 is inserted into a pair of grooves 71 provided on the frame 7 along the longitudinal direction (L) to detachably mount the lens 6 to the frame 7.

Figure 4:
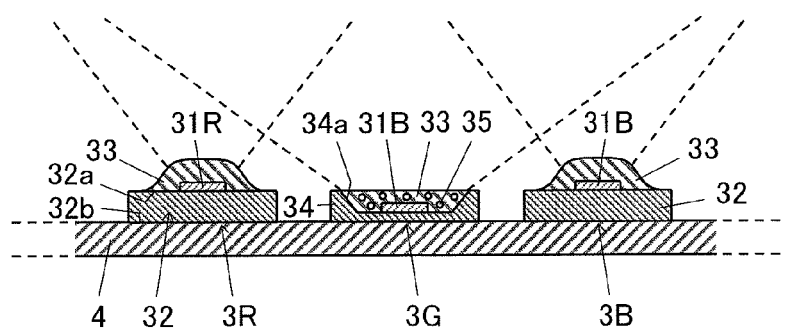
FIG. 4 is a cross-sectional view of LEDs forming the lighting apparatus.

As shown in FIG. 4, the red LED 3R includes a red LED chip 31R that emits red light, a base 32 on which the red LED chip 31R is mounted, and an encapsulant 33 that encapsulates the red LED chip 31R. The red LED 3R is mounted on the wiring board 4 via a mounting surface 32b of the base 32 located at the side opposite to an LED-chip-mounted surface 32a of the base 32. The base 32 has a wiring (not shown) having one end connected to the red LED chip 31R and the other end led from the mounting surface 32b. The wiring led from the mounting surface 32b is connected to a wiring pattern (not shown) of the wiring board 4. The base 32 is formed of a material excellent in heat conductivity and heat resistance, such as aluminium or ceramics.

The blue LED 3B is configured in the same manner as the red LED 3R, except having a blue LED chip 31B that emits blue light instead of the red LED chip 31R.

The green LED 3G includes the blue LED chip 31B, a base 34 on which the blue LED chip 31B is mounted, and green phosphor 35 that is dispersed in the encapsulant 33 and converts blue light into green light. The base 34 has a recess 34a at the center thereof, and the blue LED chip 31B is disposed on the bottom surface of the recess 34a. The recess 34a is filled with the encapsulant 33 including the green phosphor 35. As with the base 32 of the red LED 3R and the blue LED 3B, the base 34 also has a wiring (not shown), and the wiring connects the blue LED chip 31B to the wiring pattern (not shown) of the wiring board 4.

Generally, a green LED chip that emits green light has lower energy-to-light conversion efficiency and lower emission luminance than the blue LED chip 31B and the like. The green LED 3G configured by a combination of the blue LED chip 31B and the green phosphor 35 as described above has improved energy-to-light conversion efficiency and improved emission luminance as compared to a green LED configured by use of the green LED chip.

The red LED 3R and the blue LED 3B configured as described above each have a relatively narrow light distribution angle (e.g., 80°), like a general LED. In contrast, in the case of the green LED 3G since the green phosphor 35 itself excited by blue light from the blue LED chip 31B emits light, the entirety of the encapsulant 33 including the green phosphor 35 acts like a pseudo light source, and thus, the green LED 3G has a relatively wide light distribution angle (e.g., 120°). The red LED 3R and the blue LED 3B each having the narrow light distribution angle are arranged in such a manner as to sandwich the green LED 3G having the wide light distribution angle.

According to the lighting apparatus 1 of the present embodiment, since the green LED 3G having the wide light distribution angle is disposed medially, green light emitted from the green LED 3G is sufficiently mixed with red light and blue light emitted from the red LED 3R and the blue LED 3B adjacent to the green LED 3G. Therefore, color unevenness of illuminating light can be reduced. Furthermore, since the drive circuit 5 individually performs dimming control of the red LED 3R, the green LED 3G, and the blue LED 3B, color of light emitted from the lighting apparatus 1 can be arbitrarily controlled. Accordingly, it is possible to perform various kinds of artificial lighting, such as producing an atmosphere of early morning by illuminating the ceiling C in the cabin with pale light, and producing an atmosphere of twilight by illuminating the ceiling C with orange light.

Figure 5:
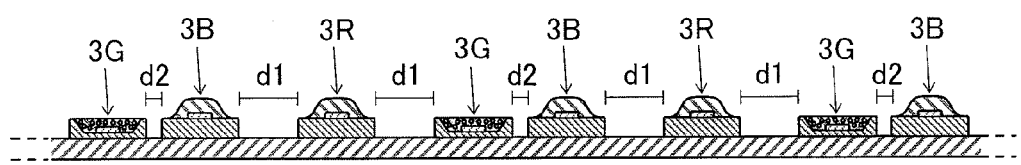
FIG. 5 is a cross-sectional view showing arrangement of LEDs forming a lighting apparatus according to a more preferable form of the above embodiment.

Next, a lighting apparatus according to a more preferable form of the above embodiment will be described with reference to FIG. 5. In this lighting apparatus, a distance d1 between the red LED 3R, and the green LED 3G or the blue LED 3B is greater than a distance d2 between the green LED 3G and the blue LED 3B. Accordingly, heat that is caused in the green LED 3G and the blue LED 3B in association with their light emission is less likely to be transferred to the red LED 3R, and thus, reduced output of red light emission, which could be caused by rise in temperature of the red LED 3R, can be prevented.

Figure 6:
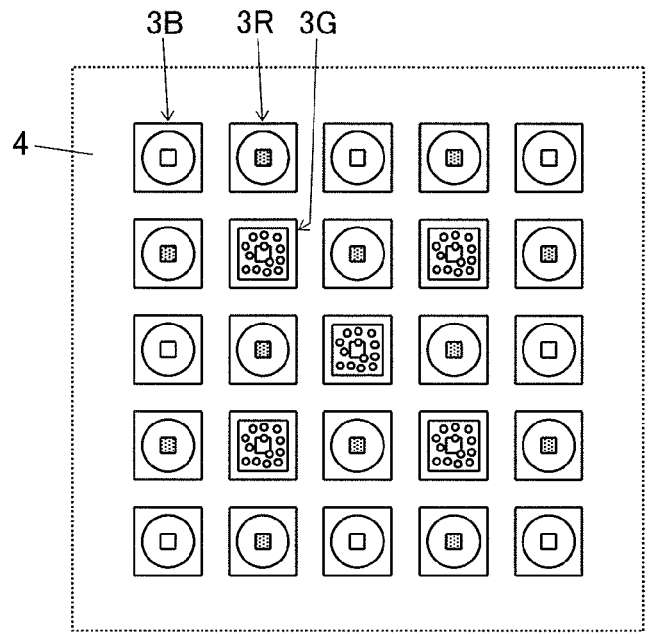
FIG. 6 is a top view showing arrangement of LEDs forming a lighting apparatus according to a modification of the above embodiment.
Figure 7:
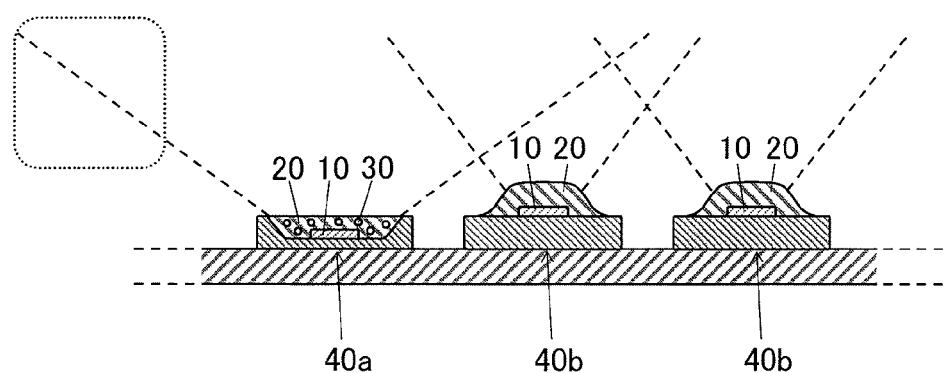
FIG. 7 is a cross-sectional view of LEDs forming a conventional lighting apparatus.

Next, a lighting apparatus according to a modification of the above embodiment will be described with reference to FIG. 6. In the lighting apparatus of this modification, the red LEDs 3R, the green LEDs 3G, and the blue LEDs 3B are arranged in a matrix of 5×5 on the wiring board 4. Here, the green LEDs 3G are arranged in an inner portion of the matrix, and the red LEDs 3R and the blue LEDs 3B are arranged in a peripheral portion of the matrix. Accordingly, a surface-emitting lighting apparatus that emits light with reduced color unevenness can be obtained.

The lighting apparatus according to the present invention is not limited to the above embodiment and the modification thereof, and may be modified in various manners. For example, the lighting apparatus may include an LED that emits light of a color other than RGB. Specifically, the lighting apparatus may include a white LED that emits white light in addition to the RGB LEDs. Such a white LED includes, for example, a blue LED chip and yellow phosphor that converts blue light into yellow light, and is surrounded by LEDs having a narrow light distribution angle as in the case of the green LED of the above embodiment.

DESCRIPTION OF THE REFERENCE CHARACTERS 1 lighting apparatus
3 LED
3R red LED
3G green LED
3B blue LED
31R (red) LED chip
31B (blue) LED chip
35 (green) phosphor
d1 distance between red LED, and green LED or blue LED
d2 distance between green LED and blue LED

The invention claimed is:

1. A lighting apparatus comprising:
three or more light emitting diodes (LEDs) arranged in a row or a matrix, wherein
the three or more LEDs are adjacent to each other and emit lights of different colors, respectively, and comprise at least one LED having a relatively wide light distribution angle and LEDs each having a relatively narrow light distribution angle, and
the LED having the wide light distribution angle is arranged between the LEDs each having the narrow light distribution angle and
each of the three or more LEDs include an LED chip and an encapsulant that encapsulates the LED chip, and
the LED having the wide light distribution angle further includes phosphor that is dispersed in the encapsulant and converts a wavelength of light emitted from the LED chip.

2. The lighting apparatus according to claim 1, wherein
in the LED having the wide light distribution angle,
the LED chip is formed by a blue LED chip that emits blue light, and
the phosphor is formed by green phosphor that converts blue light into green light.

3. The lighting apparatus according to claim 1, wherein
the three or more LEDs comprise a red LED including a red LED chip that emits red light, a green LED that emits green light, and a blue LED that emits blue light, and
a distance between the red LED, and the green LED or the blue LED is greater than a distance between the green LED and the blue LED.

4. The lighting apparatus according to claim 2, wherein
the three or more LEDs comprise a red LED including a red LED chip that emits red light, a green LED that emits green light, and a blue LED that emits blue light, and
a distance between the red LED, and the green LED or the blue LED is greater than a distance between the green LED and the blue LED.

5. The lighting apparatus according to claim 2, wherein the matrix comprises a matrix of red LEDs, green LEDs, and blue LEDs, in which the green LEDs have the wide light distribution angle and are arranged in an inner portion of the matrix.

6. A lighting apparatus comprising:
a plurality of light emitting diodes (LEDs) arranged in one of a row and a matrix, wherein
three or more of the plurality of LEDs are arranged adjacent to each other, emit lights of different colors, respectively, and comprise at least one LED having a relatively wide light distribution angle and LEDs each having a relatively narrow light distribution angle, and
the LED having the wide light distribution angle is arranged between the LEDs each having the narrow light distribution angle and
each of the three or more LEDs include an LED chip and an encapsulant that encapsulates the LED chip, and
only the LED having the wide light distribution angle further includes phosphor that is dispersed in the encapsulant and converts a wavelength of light emitted from the LED chip.

7. The lighting apparatus according to claim 6, wherein
in the LED having the wide light distribution angle,
the LED chip is formed by a blue LED chip that emits blue light, and
the phosphor is formed by green phosphor that converts blue light into green light.

8. The lighting apparatus according to claim 6, wherein
the three or more of the plurality of LEDs comprise at least a red LED including a red LED chip that emits red light, a green LED that emits green light, and a blue LED that emits blue light, and
a distance between the red LED, and the green LED or the blue LED is greater than a distance between the green LED and the blue LED.

9. The lighting apparatus according to claim 7, wherein
the three or more of the plurality of LEDs comprise at least a red LED including a red LED chip that emits red light, a green LED that emits green light, and a blue LED that emits blue light, and
a distance between the red LED, and the green LED or the blue LED is greater than a distance between the green LED and the blue LED.

10. The lighting apparatus according to claim 7, wherein the matrix comprises a matrix of red LEDs, green LEDs, and blue LEDs, in which the green LEDs have the wide light distribution angle and are arranged in an inner portion of the matrix.

* * * * *